June 7, 1960 VON D. POLHEMUS 2,939,698
AIR SPRING
Filed March 30, 1956
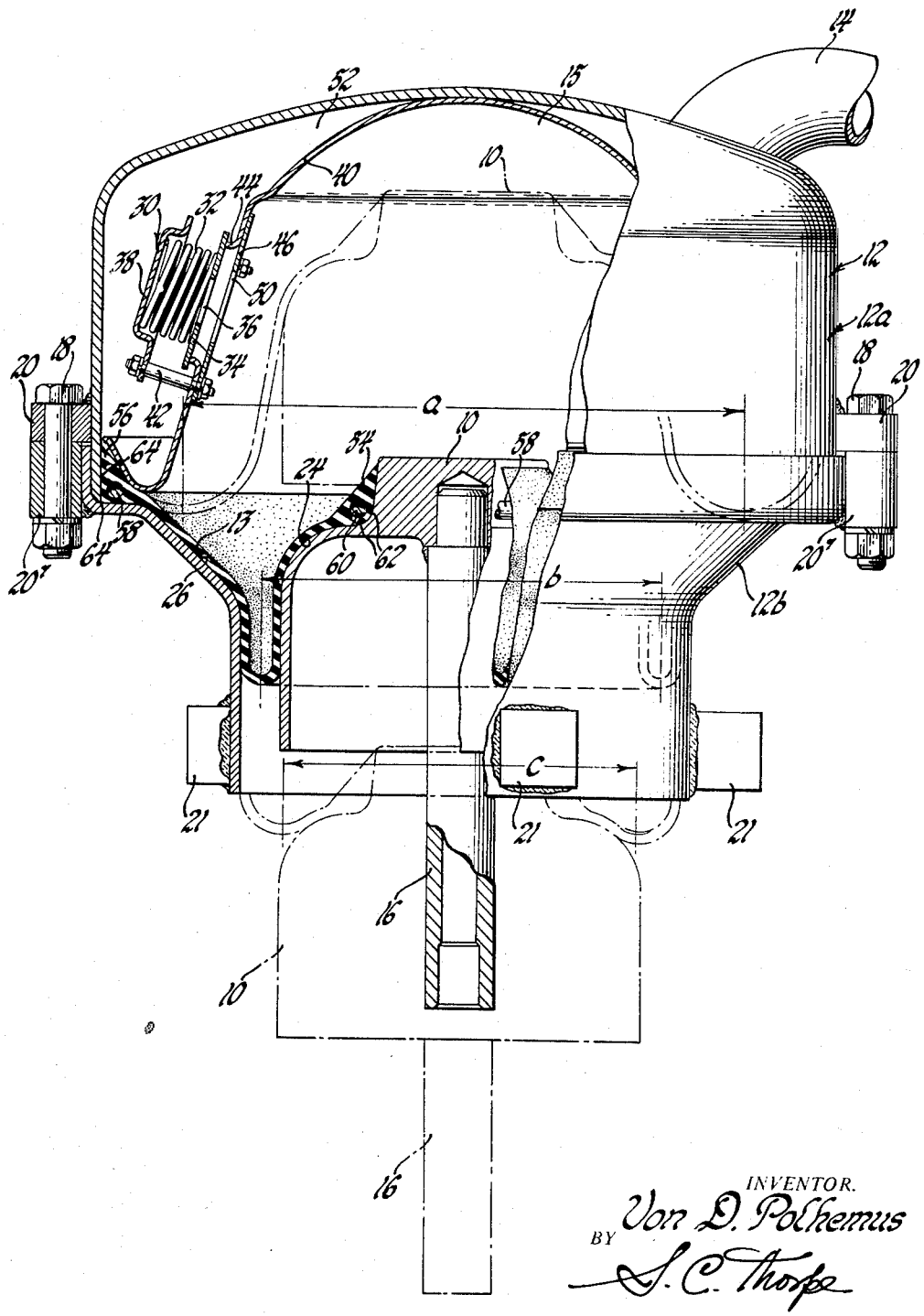
INVENTOR.
Von D. Polhemus
BY
S. C. Thorpe
ATTORNEY United States Patent Office 2,939,698
Patented June 7, 1960

2,939,698
AIR SPRING

Von D. Polhemus, Franklin, Mich., assignor to General Motors Corporation, Detroit, Mich., a corporation of Delaware Filed Mar. 30, 1956, Ser. No. 575,120

5 Claims. (Cl. 267—65)

This invention concerns air springs of the diaphragm type, particularly as applied to automotive vehicles.

Such springs, broadly old in the patent art, differ from the air springs in current use on heavy passenger vehicles (see U.S. Patent 2,691,420 to Fox et al.; also GM Engineering Journal vol. 1, No. 2, September—October '53, page 40) in that the flexible component has little strength in the way of being self-supporting and in that the same is formed with bead rings of different diameters, necessary in view of the telescopic disposition of the associated piston and air reservoir. These latter parts undersupport the flexible component or diaphragm except in the area corresponding to the spacing between them and it is customary to form their mutually adjacent walls so that this spacing varies on deflection of the spring, the purpose being to progressively increase the effective area of the piston on its compression stroke.

The present invention aims to simplify the construction of the spring and in particular to provide such a spring which is not dependent on the use of clamping devices, as heretofore employed, to maintain the diaphragm in sealing engagement with the walls of the piston and reservoir. In this way, the spring is rendered less costly to manufacture, assemble, and install, and it becomes practical for commercial application. In addition, the possibility of leaks and the entry of dirt and moisture into the body of the spring, experienced with springs constructed according to prior disclosures, is substantially completely eliminated.

The invention will be described with reference to the accompanying drawing illustrating a preferred embodiment thereof.

In the drawing, the numeral 10 denotes the piston component of the spring, 12 the reservoir component and 13 the diaphragm. Secured to the reservoir component, which on installation of the spring is affixed to the frame or body of the vehicle, is a fixture 14 opening to the reservoir and adapted to be connected to a hose line or the equivalent extending to a source of air supply as a tank, not shown, served by an air compressor powered by the engine of the vehicle. If desired, an expansion tank or container may be interposed in the line between the fixture and the supply tank to increase the reservoir capacity.

Piston 10 includes a stem or shaft 16 through which the piston is connected in any suitable way to an axis of the vehicle. It will be understood that normally there are four springs located approximately at the corners of the vehicle, assuming a conventional passenger car installation.

The reservoir 12 will be seen as constituted of two parts 12a and 12b joined by bolts 18 extending through lugs or ears 20, 20', shown as affixed to the parts 12a and 12b, respectively, by welding. Section 12b additionally carries lugs or ears 21 through which the connection of the reservoir to the frame or body of the vehicle may be effected.

It will be understood that compression and expansion of the spring is marked by up and down movement of the piston 10 and that the upward movement of the piston is resisted by the pressure of air within the chamber 15. On such movement, and as indicated by the upper dot and dash line representation of the piston and diaphragm, the diaphragm is gradually "peeled" from the sloping wall 26 of the reservoir section 12b to progressively increase the effective piston diameter. Thus, the spring becomes progressively stiffer on the compression stroke of the piston. Conversely, as the piston moves downwardly (note the bottom dot and dash line representation of the piston and diaphragm) the effective operating diameter thereof decreases as the diaphragm is "peeled" from the tapered wall 24 of the piston. It has been established by calculations and test that in a spring of the type disclosed, the effective operating diameter of the piston in any position thereof is the distance between two diametrically opposite lines extending upwardly from the mid-point of the loop or meniscus of the diaphragm— note lines $a$, $b$, and $c$ in the drawing.

In addition to the components above, the particular spring construction illustrated comprises within the reservoir section 12a, a valve 30 serving as a rebound damper. This valve incorporates a spring 32 loading a flap piece 34 having an opening 36 therein. The spring 32 is backed by a seat 38 fastened to a mounting member 40 by means of bolts 42. Such member will be noted as including a boss portion 44, inward of which is a plate 46 apertured to recevice the bolts 42 and having an opening 50 therein.

Mounting 40 delineates the previously mentioned chamber 15 and an outer "expansion" chamber 52, to which fixture 14 directly opens. In operation, as the piston 10 moves upwardly on its compression stroke, air from the reservoir chamber 15 initially enters the chamber 52 from chamber 15 through opening 36. However, at a predetermined pressure within the chamber 15 element 34 is lifted off its seat against the resistance of the spring 32, with the result that the opening to the expansion chamber is increased. Now, as the piston moves downwardly following completion of its compression stroke, element 34 re-seats by force of the spring 32, again reducing the diameter of the opening between the two chambers. The speed at which chamber 15 can refill with air from chamber 52 is consequently limited, and the next upward stroke of the piston is thus cushioned, preventing the oscillations conventional shock absorbers serve to mitigate.

In accordance with the invention, instead of relying on clamps and similar devices to sealingly join the diaphragm and the metal parts, the bead rings 54, 56 of the diaphragm 13, which may be formed in the conventional manner of rubber or other elastomer reinforced by nylon cords anchored to metal rings at 58 and 60, are maintained in sealing engagement on the seats 62, 64 by the pressure of the air in the chamber 15 and the expansion chamber 52, respectively, the air pressure in the case of the latter chamber being supplemented by the valve mounting 40, which is under some compression by reason of its contact with the top of the reservoir section 12a. The rim of the mounting is coextensive with the bead.

It should be understood that the spring is operable without the damper valve and in the event the same is omitted full reliance may be placed on air pressure alone to maintain the outer seal.

Rings 58 and 60 may be solid metal or may be formed of woven or unwoven wires, for example. The cord disposition and distribution is varied, of course, as determined by the points of maximum strain. The spring action proceeds with little if any stretching of the diaphragm.

The invention being thus described and illustrated, what is claimed is:

1. An air spring comprising a reservoir member and a piston member with a flexible diaphragm element therebetween, said reservoir member being designed to telescopically receive said piston member and having a partition therein delineating an inner chamber and an outer expansion chamber having communication through an opening in said partition, said diaphragm element having inner and outer peripheral beads adapted to be accommodated by correspondingly shaped seats provided, respectively, by said piston member and said reservoir member and to be maintained on said seats by the pressure of air in said inner chamber and said outer expansion chamber, respectively.

2. An air spring according to claim 1 wherein the opening between said inner chamber and said outer expansion chamber comprises a damping valve operating to vary the size of the opening in correspondence with the pressures in said chambers.

3. An air spring according to claim 2 wherein said valve comprises an apertured flap piece normally held over the opening by a spring gauged to yield at a predetermined pressure, movement of said flap piece being in a direction toward said expansion chamber.

4. An air spring comprising a reservoir member and a piston member with a flexible diaphragm element therebetween, said reservoir member being designed to telescopically receive said piston member and having a partition therein delineating an inner chamber and an outer expansion chamber having communication through a valved opening in said partition, said diaphragm element having concentric inner and outer peripheral beads adapted to be accommodated by correspondingly shaped annular seats, provided respectively, by said piston member and said reservoir member and to be maintained on said seats by the pressure of air in said inner chamber and said outer expansion chamber, respectively, the air pressure in said expansion chamber being aided mechanically by said partition being footed under some compressive force on said outer bead.

5. An air spring according to claim 4 wherein the valve controlling the opening providing the means of communication between said chambers comprises an apertured flap piece normally held over the opening by a spring gauged to yield at a predetermined pressure within said inner chamber, movement of said flap piece being in a direction toward said expansion chamber.

References Cited in the file of this patent

UNITED STATES PATENTS

| 1,133,337 | Tinkham | Mar. 30, 1915 |
| 1,414,623 | Church | May 2, 1922 |
| 2,578,730 | Nicholson et al. | Dec. 18, 1951 |

FOREIGN PATENTS

| 21,732 | Great Britain | Sept. 24, 1912 |